United States Patent [19]
Vanderlaan et al.

[11] 3,907,001
[45] Sept. 23, 1975

[54] COMBINATION ACCUMULATOR RESERVOIR

[75] Inventors: Robert D. Vanderlaan; Robert F. Boyle, both of Kalamazoo, Mich.

[73] Assignee: Pneumo Dynamics Corporation, Boston, Mass.

[22] Filed: Feb. 12, 1973

[21] Appl. No.: 331,522

[52] U.S. Cl. .................. 138/31; 73/47; 137/116.5; 417/543
[51] Int. Cl. ............................................. F16l 55/04
[58] Field of Search ....... 138/31, 30; 91/281; 73/47; 137/116.5; 417/543

[56] References Cited
UNITED STATES PATENTS

| | | | |
|---|---|---|---|
| 2,764,999 | 10/1956 | Stanbury | 138/31 |
| 3,093,109 | 6/1963 | Pederson | 73/322 X |
| 3,230,977 | 1/1966 | Mercier | 138/31 |
| 3,336,948 | 8/1967 | Lucien | 138/31 |
| 3,529,835 | 9/1970 | Lewis | 138/31 |
| 3,669,151 | 6/1972 | Fleming | 138/31 |

Primary Examiner—Jerry W. Myracle
Assistant Examiner—Daniel M. Yasich
Attorney, Agent, or Firm—Donnelly, Maky, Renner & Otto

[57] ABSTRACT

A combination accumulator reservoir device in a single package may be connected in a fluid system to provide fluid from the accumulator at high pressure during high system demand and during return stroke of the fluid system pump piston and from the reservoir at low pressure to return the pump piston and to maintain fluid level in the system. The device also includes means cooperable with the reservoir to maintain a small seal energizing pressure in the fluid system preventing the same from drying or the like during long term storage. Being particularly adaptable for use in hydraulic systems having a gas input and a liquid output, the accumulator reservoir device requires only one gas pressure line, one liquid pressure line, and one liquid return line, and the several seals of the device are each subject to pressure from only one of such fluids.

15 Claims, 2 Drawing Figures

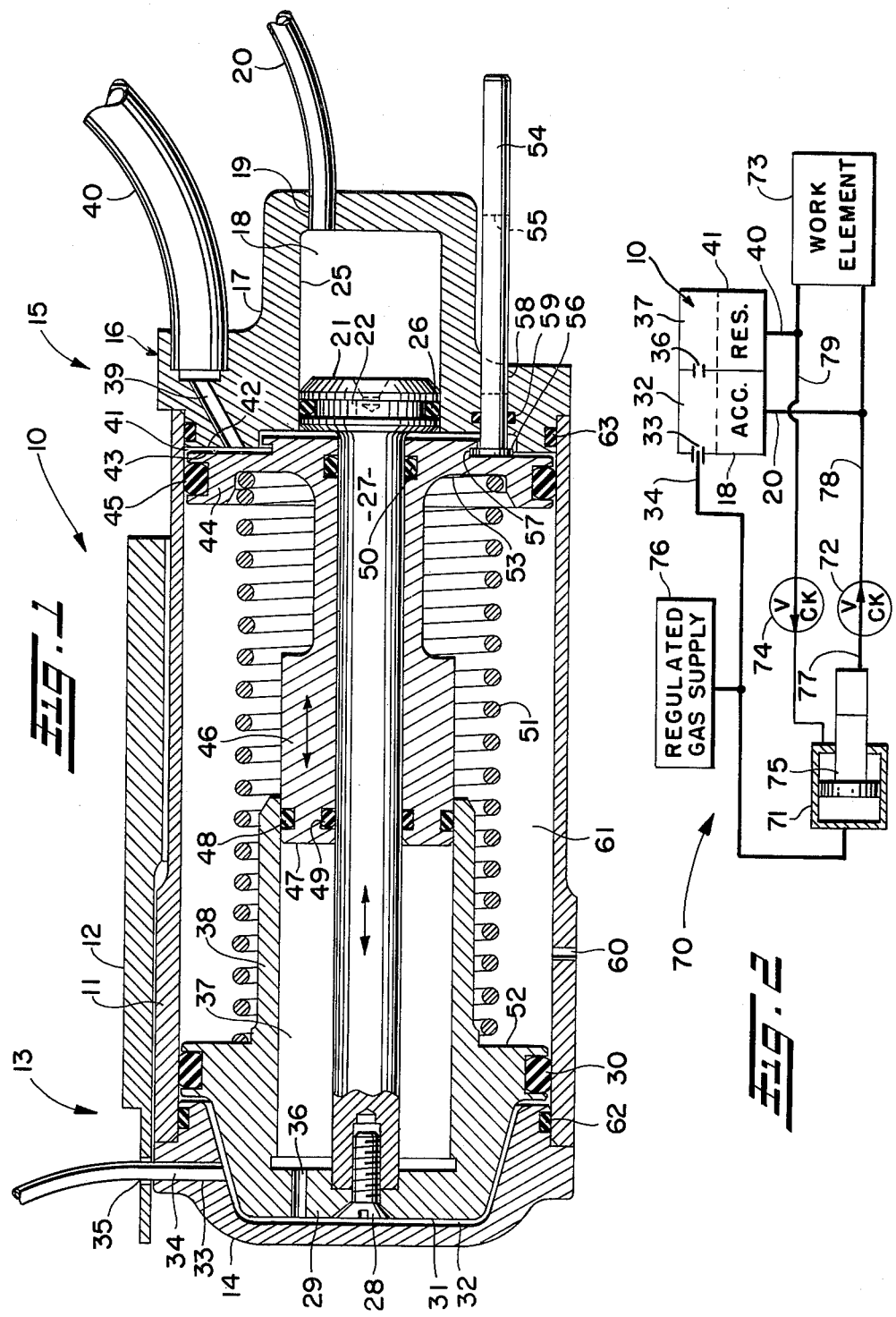

3,907,001

COMBINATION ACCUMULATOR RESERVOIR

BACKGROUND OF THE INVENTION

The invention relates to a combination accumulator and reservoir apparatus and more particularly to such a device contained in a single package for use in fluid systems.

Accumulators have been used in various types of fluid systems, such as for example those in which operation of an hydraulically driven device is intermittent, the accumulator maintaining fluid pressure in the system during high demand. The most common use of accumulators is to supply fluid during peak demands in a fluid system which has an intermittent duty cycle having both low and high power output requirements, the accumulator reducing the power supply requirements.

Such fluid systems have required not only accumulators for maintaining pressure in the fluid system as described above, but also have utilized reservoirs for storing fluid when the system is idle as well as for supplying fluid during system operation.

SUMMARY OF THE INVENTION

A primary object of this invention is to provide a high pressure accumulator and a relatively lower pressure reservoir in a single package.

Another object of the invention is to provide a combination accumulator reservoir having a low pressure reservoir and a high pressure accumulator in a single package for use in an hydraulic system to permit the use of only one gas, one pressure, and one return line.

An additional object of the invention is to provide a combination accumulator reservoir in a single package for use in hydraulic systems and particularly in such systems having a gas input and a liquid output.

A further object of the invention is to provide a combination accumulator reservoir in a single package for supplying to a fluid system liquid at pressure during high demand and a reservoir for maintaining minimum pressurization during low demand.

Still another object of the invention is to provide a combination accumulator reservoir which provides seal energizing pressure in a fluid system for long term storage.

Still an additional object of the invention is to provide in a single package a combination accumulator reservoir having a fluid charge for instant operation.

Still a further object of the invention is to provide a combination accumulator reservoir utilizing a stepped area accumulator piston with return pressure from the backside thereof producing force on the reservoir fluid thereby permitting a reduction in reservoir size by a volume amount equal to the displacement on the backside of the piston when it strokes.

Yet another object of the invention is to provide a combination accumulator reservoir having a gas input and a liquid output with respective seals subject to pressure from only one of such fluids.

Still an additional advantage of the invention is the provision of a combination accumulator reservoir with seals therefor arranged to avoid the need for high pressure liquid dynamic-to-overboard seals.

These and other objects and advantages of the instant invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principals of the invention may be employed.

BRIEF DESCRIPTION OF THE DRAWING

In the annexed drawing:

FIG. 1 is a longitudinal cross-sectional view of the combination accumulator reservoir of the invention; and FIG. 2 is a schematic representation of a fluid system in which the combination accumulator reservoir may be used.

DESCRIPTION OF THE PREFERRED EMBODIMENT

In referring to the drawings the combination accumulator reservoir will be described with reference to use in an hydraulic actuation system using oil, although the combination accumulator reservoir may be used with other fluid or fluids in various fluid systems. It is contemplated that one fluid system in which the combination accumulator reservoir may be used is an hydraulic actuation system utilizing a pump to provide pressurized fluid to work elements in the fluid system while the accumulator supplies fluid at pressure to the fluid system during high demands and during pump return stroke and the reservoir supplies a relatively low pressure to return the pump piston, to maintain a seal energizing pressure in the fluid system during long term storage, and to provide a reserve source of fluid for the fluid system. Thus, the primary input to the accumulator reservoir may be a supply of gas at regulated pressure, as described in more detail below, which would be effective to maintain respective output fluid pressures at the accumulator high pressure line output and reservoir relatively lower pressure return line output that are coupled, for example, to the input and output or return fluid lines, respectively, of a work element in such fluid system.

Referring now more specifically to FIG. 1, the combination accumulator reservoir is indicated generally at 10. The single package containing the accumulator reservoir is formed of an elongated main outer casing 11 positioned, for example, proximate a support structure 12 to which the package may be fixed. The casing 11 is closed at the input end 13 by a cover plate 14 and at the output end 15 by an accumulator assembly 16.

The accumulator assembly 16 includes a plate block 17 having an accumulator chamber 18 and an opening 19 formed in the plate to permit fluid communication between the accumulator chamber and the fluid system, such as, for example, by a connection to the input fluid line of a work element in such fluid system as mentioned above and as described in more detail below particularly with reference to FIG. 2, via an accumulator outlet tube 20. An accumulator piston 21 having a main body portion 22 is slidably positioned in the accumulator chamber 18 in sealing engagement with the walls 25 thereof by O-ring seals or packings 26. The accumulator piston 21 is connected to an actuator piston rod 27 at one end thereof, and the other end is connected by a screw 28 to a control actuating piston 29. The control actuating piston is movably and sealingly positioned within the main outer casing 11, for example by O-ring seals 30, and has a control surface 31 forming together with the cover plate 14 a control fluid chamber 32. Preferably the control fluid is a gas and will be referred to as such below, although other fluids also may be used. An opening 33 is the cover plate 14 connects the control fluid chamber 32 with a control fluid inlet tube 34 passing through an opening 35 in the support structure 12, and a connecting passage 36 connects the control fluid chamber with a supplement fluid chamber 37 formed by a housing extension portion 38 of the control actuating piston 29.

A fluid passageway 39 through the plate 17 of the accumulator assembly 16 provides a connection between a reservoir outlet tube 40, which may be connected to the fluid system, and a reservoir chamber 41 formed in the main outer casing 11 between the inner surface 42 of the plate 17 and the front surface 43 of a reservoir piston 44. The reservoir piston 44 is positioned in sliding sealed relation in the main outer casing 11, for example by O-ring seals 45, and includes an actuator piston rod portion 46 having a control surface area 47 extending into the supplemental fluid chamber 37 in sliding sealed relation with the housing extension portion 38 of the control actuating piston 29 and the actuator piston rod 27 by respective O-ring seals 48 and 49. The reservoir piston 44 is also provided with an O-ring seal 50 located near the front surface 43 thereof to complete sealing of the reservoir chamber 41.

A resilient member or spring 51, located within the main outer casing 11 and positioned in abutting relation with the surface 52 of the control actuating piston 29 and the surface 53 of the reservoir piston 44, provides a force between both pistons urging them apart. A fill indicator 54 having indicating markings 55 thereon is connected by a flange 56 to the reservoir piston 44 by a groove 57 formed therein. The fill indicator 54 extends through an opening 58 in the accumulator assembly plate 17 and is sealed by an O-ring 59. A vent opening 60 in the main outer casing 11 maintains the central chamber 61 thereof at the ambient pressure of the air or other environment external of the casing 11 to facilitate sliding movement of the respective pistons 29 and 44, and the cover plate 14 and accumulator assembly plate 17 are connected in sealed engagement with the main outer casing, for example by respective O-ring seals 62 and 63. Therefore seals or packings 30, 48, 49, and 62 are subject only to gas pressure while the seals or packings 26, 45, 50, 59, and 63 are subject only to liquid pressure, thereby permitting the seals to function efficiently and to prevent the possibility of the different fluids from intermixing in the event of seal leakage.

The double-headed arrows shown in the drawing on the respective piston rod 27 and actuator piston rod portion 46 indicated that such piston rods are capable of independent relative movement in the directions of the arrows. Moreover, the combination accumulator reservoir 10 is schematically illustrated in FIG. 2 in which the single package thereof is boxed in, as shown, and is generally designated by the reference numeral 10. The accumulator chamber 18 and the reservoir chamber 41 are identified within the overall combination accumulator reservoir package 10. The opening 33 to the combination accumulator reservoir package 10 is also shown with the control fluid inlet tube 34 passing through and in engagement with the same to provide control fluid from the tube 34 into the control fluid chamber 32. Also, the connecting passage 36 between the control fluid chamber 32 and the supplemental fluid chamber 37 is also illustrated. The dotted line along the center of the combination accumulator reservoir 10 illustrated in FIG. 2 is indicative of the separation between the control fluid chamber 32 and the accumulator chamber 18 and between the supplemental fluid chamber 37 and the reservoir chamber 41.

Turning now to FIG. 2, a fluid system generally indicated at 70 in which the combination accumulator reservoir 10 is used includes a piston pump or intensifier 71, an input check valve 72, a conventional hydraulic work element 73, and a return check valve 74, all being in fluid commination by appropriate flow lines. The piston pump intensifier 71 includes a piston 75 containing appropriate valving which is driven by a regulated gas supply 76 the latter also being coupled as the input pressurized control gas at the control fluid input tube or line 34 to the combination accumulator reservoir, line 36 in FIG. 2 representing the passageway designated by the same number in FIG. 1. Fluid is pressurized by the action of the piston pump, which is well known in the art, and is directed by the flow line 77, the input check valve 72, and the flow line 78 to the work element 73, which is operable in response to pressurized fluid. The flow line 79 directs return fluid from the work element through the return check valve 74, for example, for repressurization by the piston pump 71. During forward stroking of the piston 75 the input check valve 72 permits pressurized fluid to flow therethrough while the return check valve 74 blocks flow, and during the piston return stroke the input check valve 72 blocks fluid flow while the return check valve 74, for example, permits flow therethrough to the piston pump 71 for repressurization as is well known in the art. The accumulator chamber 18 is connected by the accumulator outlet tube 20 to the flow line 78, and the reservoir chamber 41 is connected by the reservoir outlet tube 40 to the flow line 79 in the field system 70.

Briefly described, the operation of the combination accumulator reservoir 10 includes charging with fluid the accumulator chamber 18 and reservoir chamber 41; and, assuming the outlet tubes 20, 40 are coupled to respective lines in a fluid system, without more, the spring 51 urges the control actuating piston 29 away from the reservoir piston 44, which action maintains the accumulator chamber 18 substantially fully charged with fluid and also maintains the fluid in the reservoir chamber under at least nominal pressure for seal energizing purposes or the like. Moreover, a pressurized gas input via the tube 34 into the control fluid chamber 32 urges the control actuating piston 29, piston rod 27 and accumulator piston 21 to the right, as shown in FIG. 1, in order to maintain a relatively constant high pressure in the accumulator chamber 18; and simultaneously a portion of such input pressurized gas passes through the passageway 36 into the supplemental fluid chamber 37 to provide a force on the surface area 47 of the reservoir piston 44 in order to drive the same also in a direction to the right maintaining a pressure, lesser in magnitude than that in the accumulator chamber, on the fluid in the reservoir chamber 41. As the various pistons move within the casing 11, any ambient air or other fluid medium within the chamber 61 is vented to the atmosphere or other environment via the vent 60 to prevent pressure build-up within the chamber 61 and to allow the several pistons to move relatively freely therein. It is noted that during such pressurized operation of the accumulator and reservoir under the influence of the input pressurized gas, the force exerted by the spring 51 is negligible and can be ignored.

Operation of the combination accumulator reservoir 10, shown in FIG. 1 will be described hereinafter with reference to application in the fluid system 70, shown in FIG. 2, although the combination accumulator reservoir may be used in various other types of systems for performing similar functions. During normal operation of the fluid system 70 the piston pump 71 provides pressurized fluid, such as oil or other hydraulic fluid, to the work element 73 as the piston 75 strokes forward, i.e. to the right, according to the work effort of the regulated gas supply 76. The pressurized fluid then delivers energy to the work element 73, and afterwards the fluid is delivered via the flow line 79 through the check valve 74, for example, to the piston pump 71 during the return stroke of the piston 75, i.e. to the left. During the piston return stroke fluid pressure in the flow line 78 may drop, for example because the input check valve 72 is closed and the work element 73 is utilizing the energy of the fluid in such flow line. Therefore, the accumulator 18 provides through the accumulator outlet tube 20 a source of pressurized fluid to the flow line 78 to maintain the high pressure therein. Also, when the work element 73 demands pressurized fluid at a rate greater than that which the piston pump 71 can supply or if the latter becomes inoperative, the accumulator 18 provides supplemental pressurized fluid through the accumulator outlet tube 20. As the piston 75 strokes forward supplying pressurized fluid to work element 73, used fluid from the work element is stored in the reservoir 41, for such used fluid cannot pass to the left through check valve 74 while the piston 75 is stroking to the right as shown in FIG. 2; and during piston 75 return stroke fluid stored in the reservoir is supplied by the reservoir through the reservoir outlet tube 40 to the piston pump 71.

As input pressurized fluid, such as gas, is directed through the control fluid inlet tube 34 into the control fluid chamber 32 from the regulated gas supply 76, the control actuating piston 29 is urged to the right according to an actuating force equal to the pressure in the control fluid chamber times the perpendicular surface area of the piston 29 less the annular surface area 47 of the reservoir control piston 46. The actuating force is transmitted by the piston rod 27 to the accumulator piston 21, and in turn to the fluid in the accumulator chamber 18. As the perpendicular surface area of the control actuating piston 29 less the annular surface area 47 of the reservoir control piston 46 is larger than that of the accumulator piston 21, the pressure in the accumulator chamber 18 is larger than that in the control fluid chamber 32 according to the ratio of the effective perpendicular areas. Since the pressure in the control fluid chamber 32 remains constant according to the input gas pressure through the inlet tube 34, as pressure in the accumulator chamber 18 decreases, for example when the pump piston 75 is on return stroke, the accumulator piston 21 is urged to the right to balance the pressures in the accumulator chamber 18 and the control fluid chamber 32, thereby maintaining a relatively stable pressure level in the flow line 78 of the fluid system 70. Similarly, as the pump piston 75 travels on its forward stroke and pressure in the flow line 78 increases, the accumulator piston 21 is urged back to the left again balancing pressures in the accumulator chamber 18 and the control fluid chamber 32. The reason that the accumulator piston is urged back to the left again is because the pump output pressure preferably is slightly higher than the accumulator output pressure. Thus for normal demands, the pump is able to maintain the accumulator charged.

The input pressurized gas through the inlet tube 34 also fills the supplemental fluid chamber 37 through the connecting passage 36 to thereby maintain a biasing force on the control surface area 47 of the reservoir piston 44. The force on the control surface area 47 is equal to the pressure in the supplemental chamber 37 times the perpendicular surface area of the control surface area 47, and this biasing force is transferred by the actuator piston rod portion 46 to the front surface 43 of the reservoir piston 44 to maintain fluid pressurization in the reservoir chamber 41. As the control surface area 47 is of smaller perpendicular area than the perpendicular area of the front surface 43 of the reservoir piston 44, therefore the pressure within the reservoir chamber will be maintained at a level less than that in the supplemental fluid chamber 37 by the appropriate ratio of the respective perpendicular surface areas.

As the pump piston 75 operates in forward stroke under the influence of gas pressure from the regulated gas supply 76, the check valve 74 is closed preventing fluid flow therethrough, and the pressurized fluid flowing through flow line 78 and the work element 73 passes to the flow line 79. With the regulated gas supply 76 supplying the piston pump 71, the pumping rate will vary with the demand from the work element 73. In order to avoid high pressure build-up in the flow line 79, which will eventually stall the piston pump 71, pressurized fluid is transmitted through the reservoir outlet tube 40 through the passageway 39 into the reservoir chamber 41 increasing the pressure therein and the volume thereof. In order to balance the pressures in the reservoir chamber 41 and the supplemental fluid chamber 37 the reservoir piston 44 moves to the left. When the pump piston reaches the end of its pumping stroke, the valving in the pump piston vents the head end gas chamber of the pump. The reservoir pressure then forces the pump piston to return to the left by flow through the check valve 74. As the pump piston 75 is on return stroke, fluid is drawn from the flow line 79 through the check valve 74 increasing pressure at the reservoir outlet tube 40 as well as that within the reservoir chamber 41, and the reservoir piston 44 is then urged to the right according to the pressure in the supplemental fluid chamber 37 from the regulated gas supply 76 thereby to supply fluid to the flow line 79 while the check valve 74 avoids a possible vacuum build-up and assists the pump piston in its return stroke. When the pump piston reaches the end of the return stroke, the valving within the piston again pressurizes the layer head end of the pump piston and the pumping cycle repeats.

The force constant of the spring 51 is relatively low compared to the pressures obtained in the various chambers during normal working operation of the combination accumulator reservoir device 10 and is therefore not considered a factor during normal operation. However, when the fluid system 70 and the combination accumulator reservoir therein are idle or inactive, for example during storage, it is desirable to maintain a low seal energizing pressure in the flow system and the device to avoid drying of the seals and/or possible fluid leakage from the system. Accordingly, the spring 51 urges the reservoir piston 44 to the right thereby maintaining at least a seal energizing pressure on the fluid in the reservoir chamber 41 as well as in the entire fluid system 70. The spring 51 also urges the control actuating piston 29, connected to the accumulator piston 21, to the left to thereby maintain a full fluid charge within the accumulator chamber 18 during storage, whereby the accumulator chamber is always ready for instant energization and utilization in the fluid system. Thus, upon receipt of input pressure the chamber 32 and the accumulator piston 21 will provide fluid at high pressure to the work element 73 regardless of the operation of the pump 71. The fill indicator 54 slides with the reservoir piston 44 to indicate the quantity of fluid in the reservoir chamber 41. Since the accumulator and reservoir are contained in a single package as previously described, only one gas inlet 34, one relatively high fluid pressure line 20, and one relatively lower fluid pressure return line 40 are required between the accumulator reservoir package 10 and the other elements of the fluid system 70.

As can now be understood from the foregoing description, the invention provides a combination accumulator reservoir in a single package for use in a fluid system to provide pressurized fluid to the system both during normal operation and during storage.

The embodiments of the invention in which an exclusive property or privilege is claimed are defined as follows:

1. A fluid actuator for a fluid system comprising a casing, an accumulator fluid chamber and a reservoir fluid chamber formed proximate each other in said casing for pressurization at respectively different pressures, each of said fluid chambers having a respective fluid outlet for coupling in such fluid system, first piston means for pressurizing fluid in said accumulator fluid chamber, said first piston means being movably positioned in said casing and having first and second opposed surfaces, the first being in fluid communication with said accumulator fluid chamber and the second being in fluid communication with said reservoir fluid chamber, second piston means for pressurizing fluid in said reservoir chamber, said second piston means being movable in said casing independently of said first piston means, said first and second piston means including a respective portion positioned concentrically with respect to each other and actuating means for applying an actuating force to said first piston means and to said second piston means to effect pressurization of fluid in both said respective fluid chambers, whereby upon such actuation of said fluid actuator fluid pressure at said respective fluid outlets is maintained substantially constant at respect levels.

2. A fluid actuator as set forth in claim 1, wherein said means for actuating comprises first and second piston rod means respectively coupled in mechanical relation to said first and second piston means, and means for applying force through said respective piston rod means to said respective piston means, whereby upon actuation of said piston means the latter are urged to reduce the volumes of the respective chambers thereby increasing fluid pressure therein.

3. A fluid actuator as set forth in claim 2, wherein said first and second piston rod means comprise elongated, concentrically positioned, independently operable piston rod means, and said means for applying force comprises means receiving a supply of pressurized input control fluid for directing such fluid to respective first and second surfaces at one end of each of said piston rod means providing actuating pressure therefor to develop actuating force for said piston means.

4. A fluid actuator as set forth in claim 1, further comprising resilient means for urging said piston means together thereby to maintain said accumulator chamber in substantially filled condition and to maintain substantially constant fluid pressure level in said reservoir chamber and at the outlet thereof.

5. A fluid actuator as set forth in claim 1, wherein said means for actuating comprises first and second piston rod means respectively connected to said piston means, said piston rod means comprising first and second surfaces respectively, first and second control fluid chambers for applying pressurized control fluid to said respective first and second surfaces, whereby application of control fluid to said control fluid chambers produces an actuating force on said respective surfaces of said piston rod means to maintain pressures in the respective accumulator and reservoir chambers.

6. A fluid actuator as set forth in claim 1, further comprising fill indicator means for indicating fluid level in said reservoir chamber.

7. A combination accumulator reservoir device for connection to a fluid system, comprising a casing; an accumulator assembly in said casing, including an accumulator chamber, a fluid outlet means for coupling said accumulator chamber to such a fluid system, first piston means movable in said casing for pressurizing said accumulator chamber, and first means for applying force to said first piston means to urge the same into said accumulator chamber for applying force to pressurize fluid in the latter; a reservoir assembly in said casing, including a reservoir chamber, fluid outlet means for coupling said reservoir chamber to such fluid system, second piston means movable independently of said first piston means for pressurizing said reservoir chamber, and second means for applying force to said second piston means to urge the same into said reservoir chamber for applying force to pressurize fluid in the latter; said first and second piston means including a respective portion position concentrically with respect to each other and actuating means for energizing said combination accumulator reservoir device, said actuating means applying force to both said first and second piston means for urging them in the same direction into said respective accumulator and reservoir chambers to pressurize fluid therein at different respective pressures.

8. A combination accumulator reservoir device as set forth in claim 7, wherein said actuating means comprises first and second control pistons having respective surfaces, the former comprising a piston rod for said accumulator assembly piston means and the latter comprising a piston rod for said reservoir assembly piston means, and means for applying to said control piston surfaces a supply of pressurized control input fluid, whereby upon application of such presssurized control input fluid to said control piston surfaces force is transmitted to said piston means to urge the same into said respective chambers.

9. A combination accumulator reservoir device as set forth in claim 7 further comprising means for urging said accumulator piston means and said reservoir piston means together when said combination accumulator reservoir device is not energized to maintain said accumulator chamber in substantially filled condition and to maintain a substantially constant pressure in said reservoir chamber and at said fluid outlet means thereof.

10. A fluid actuator for a fluid system comprising a casing, an accumulator fluid chamber and a reservoir fluid chamber formed proximate each other in said casing for pressurization at respectively different pressures, each of said fluid chambers having a respective fluid outlet for coupling in such fluid system, first piston means for pressurizing fluid in said accumulator fluid chamber, said first piston means being movably positioned in said casing and having first and second opposed surfaces, the first being in fluid communication with said accumulator fluid chamber and the second being in fluid communication with said reservoir fluid chamber, second piston means for pressurizing fluid in said reservoir chamber, said second piston means being movable in said casing independently of and relative to said first piston means, and actuating means for applying an actuating force to said first piston means and to said second piston means to effect pressurization of fluid in both of said respective fluid chambers, whereby upon such actuation of said fluid actuator fluid pressure at said respective fluid outlets is maintained substantially constant at respective levels, said actuating means comprising first and second piston rod means respectively coupled in mechanical relation to said first and second piston means, said actuating means applying force to said first piston means and to said second piston means through said respective first and second piston rod means, said first and second piston rod means being elongated, concentrically positioned, and independently operable, said actuating means including means receiving a supply of pressurized input control fluid for directing such fluid to a respective surface at one end of each of said first and second piston rod means to provide actuating pressure therefor to develop actuating force for said respective first and second piston means, and said surface of said first piston rod means being relatively larger than said surface of said second piston rod means, whereby application of equal actuating pressures to said respective surfaces produces a larger force on said first piston means relative to that produced on said second piston means.

11. A fluid actuator as set forth in claim 10, wherein said fluid in said accumulator and reservoir chambers comprises liquid and the input control fluid applying actuating pressure on said surfaces comprises gas, and further comprising vent means in said casing for maintaining ambient pressure within at least a portion of the latter, said piston means including seal means for maintaining said chambers in fluid isolation within said casing, said seal means being exposed to liquid pressure on one side thereof, and said piston rod means including further seal means for maintaining fluid isolation of said surfaces within said casing, said further seal means bieng exposed to gas pressure on one side thereof.

12. A fluid actuator for a fluid system comprising a casing, an accumulator fluid chamber and a reservoir fluid chamber formed proximate each other in said casing for pressurization at respectively different pressures, each of said fluid chambers having a respective fluid outlet for coupling in such fluid system, first piston means for pressurizing fluid in said accumulator fluid chamber, said first piston means being movably positioned in said casing and having first and second opposed surfaces, the first being in fluid communication with said accumulator fluid chamber and the second being in fluid communication with said reservoir fluid chamber, second piston means for pressurizing fluid in said reservoir chamber, said second piston means being movable in said casing independently of and relative to said first piston means, and actuating means for applying an actuating force to said first piston means and to said second piston means to effect presurization of fluid in both said respective fluid chambers, whereby upon such actuation of said fluid actuator fluid pressure at said respective fluid outlets is maintained substantially constant at respective levels, said actuating means comprising first and second piston rod means respectively connected to said first and second piston means, said first piston rod means having a first surface and said second piston rod means having a second surface, first and second control fluid chambers for applying pressurized control fluid to said respective first and second surfaces to produce an actuating force on said respective surfaces to maintain pressures in the respective accumulator and reservoir chambers, said first and second piston rod means being elongated, concentric, independently operable, and movable along a longitudinal axis, said accumulator chamber having a relatively smaller cross section than said reservoir chamber, and said first surface of said first piston rod means having relatively larger cross section than said second surface of said second piston rod means, whereby application of said control fluid to said control fluid chambers produces a relatively larger force on said first piston than on said second piston to cause a relatively higher pressure within said accumulator chamber than within said reservoir chamber.

13. A fluid actuator as set forth in claim 12, further comprising resilient means for urging said piston means together when said fluid actuator is not actuated thereby to maintain said accumulator chamber in substantially filled condition and to maintain substantially constant fluid pressure level in said reservoir chamber and at the outlet thereof.

14. A combination accumulator reservoir device for connection to a fluid system, comprising a casing; an accumulator assembly in said casing, including an accumulator chamber, a fluid outlet means for coupling said accumulator chamber to such a fluid system, first piston means movable in said casing for pressurizing said accumulator chamber, and first means for applying force to said first piston means to urge the same into said accumulator chamber for applying force to pressurize fluid in the latter; a reservoir assembly in said casing, including a reservoir chamber, fluid outlet means for coupling said reservoir chamber to such fluid system, second piston means movable independently of said first piston means for pressurizing said reservoir chamber, and second means for applying force to said second piston means to urge the same into said reservoir chamber for applying force to pressurize fluid in the latter; and actuating means for energizing said combination accumulator reservoir device, said actuating means applying force to both said first and second piston means for urging the same in the same direction into said respective accumulator and reservoir chambers to pressurize fluid therein at different respective pressures, said actuating means comprising first and second control pistons having respective surfaces, the former comprising a piston rod for said piston means and the latter comprising a piston rod for said second piston means, and means for supplying pressurized control input fluid to said respective surfaces of said first and second control pistons, said surface area of said first control piston being larger in cross section area than the cross section area of the surface of said second control piston, whereby upon application of such pressurized control input fluid to said respective surfaces of said first and second control pistons force is transmitted to said first and second piston means to urge the same into said respective accumulator chamber and reservoir chamber.

15. A combination accumulator reservoir device for connection to a fluid system, comprising a casing; an accumulator assembly in said casing, including an accumulator chamber, a fluid outlet means for coupling said accumulator chamber to such a fluid system, first piston means movable in said casing for pressurizing said accumulator chamber, and first means for applying force to said first piston means to urge the same into said accumulator chamber for applying force to pressurize fluid in the latter; a reservoir assembly in said casing, including a reservoir chamber, fluid outlet means for coupling said reservoir chamber to such fluid system, second piston means movable independently of said first piston means for pressurizing said reservoir chamber, and second means for applying force to said second piston means to urge the same into said reservoir chamber for applying force to pressurize fluid in the latter; actuating means for energizing said combination accumulator reservoir device, said actuating means applying force to both said first and second piston means for urging the same in the same direction into said respective accumulator and reservoir chambers to pressurize fluid therein at different respective pressures, said actuating means comprising first and second control pistons having respective surfaces, the former comprising a piston rod for said first piston means and the latter comprising a piston rod for said second piston means, and means for supplying pressurized control input fluid; vent means in said casing for maintaining ambient pressure in at least a portion of said casing; first seal means for each of said piston means for sealing the same relative to said respective chambers, said first seal means being in communication with fluid in at least one of said accumulator and reservoir chambers; and further seal means for said actuating means to maintain the same in sealed relation within said casing, said further seal means being in communication with said pressurized control input fluid.

* * * * *